United States Patent
Randle et al.

[15] 3,673,871
[45] July 4, 1972

[54] PORTABLE LIQUID GAS SAMPLER SYSTEM

[72] Inventors: Walter N. Randle, Saugus; Howard H. Spieth, Los Angeles; William D. English, Orange, all of Calif.

[73] Assignee: The United States of America as represented by the Secretary of the United States Air Force

[22] Filed: June 28, 1971

[21] Appl. No.: 157,140

[52] U.S. Cl. .......................................... 73/421 R, 73/422 R
[51] Int. Cl. .......................................................... G01n 1/10
[58] Field of Search ............ 73/421 R, 421 B, 421.5 R, 422 R

[56] References Cited

UNITED STATES PATENTS

| | | | |
|---|---|---|---|
| 2,327,111 | 8/1943 | Kimmell | 73/422 R |
| 2,348,806 | 5/1944 | Gillard | 73/421 B |
| 2,880,615 | 4/1959 | Hardey | 73/422 R |
| 3,133,444 | 5/1964 | Karwat | 73/421 B |
| 3,357,256 | 12/1967 | Burch | 73/421 B |

*Primary Examiner*—S. Clement Swisher
*Attorney*—Harry A. Herbert, Jr. et al.

[57] ABSTRACT

A system for removing a liquid gas sample of known volume from a flowing stream and to isolate and separate solid contaminants from the gas including a sample chamber with a jacket for liquid nitrogen to cool the gas and removable sample bottles for laboratory analysis of the gas and associated piping valves and safety valves for the system to function.

4 Claims, 3 Drawing Figures

INVENTORS
WALTER N. RANDLE
HOWARD H. SPIETH
WILLIAM D. ENGLISH
BY Harry A. Herbert Jr.
Henry S. Miller Jr.
ATTORNEYS

3,673,871

PORTABLE LIQUID GAS SAMPLER SYSTEM

BACKGROUND OF THE INVENTION

This invention relates generally to a means for sampling cryogenic fluids and more particularly to a means for obtaining a cryogenic sample of liquid gases and trapping and separating the particulate contained in the sample.

Contamination control in field operations with cryogenic liquids requires frequent sampling and testing to insure a good quality contaminant free fluid. Past experience has shown the nature and source of undesirable contaminants found in liquid gas storage and handling systems. The testing of liquid fluorine, for example, requires that both the volatile and nonvolatile particulate be filtered out and concentrated. Any sample thus taken must be separated by fractional distillation whereby the fluorine gas is released and the volatile particulate remains trapped by the filter for additional analysis. Prior art devices fail to provide means for testing liquified gases which allow the particles trapped in a filter to be examined under laboratory conditions.

Where the fluids are to be used in assemblies having critical clearances, for example, rocket engines, foreign particles could cause irreparable harm to engine components. It is therefore necessary to have small, compact liquid gas sampler that is utilizable in semi-remote locations.

SUMMARY OF THE INVENTION

The invention is designed to remove a liquid fluid sample of known volume from a flowing stream, and to isolate and separate from this sample the solid contaminants (condensible and solid particulate) and a liquid gas sample.

The sampler is a self-contained, portable apparatus needing only certain utility connections required for operation. It is packaged in an aluminum case and is provided with a removable section containing a control panel for semi-remote operation. The sampler parts and instrument panel can slide out as a unit from the other section of the case. The entire unit is supported on a dolly with semi-pneumatic rubber tires and handles arranged for transporting the unit.

While the invention is considered portable, certain services normally available at any liquid gas facility are required. These include liquid nitrogen for chilling the sampler, helium and vacuum for purging, nitrogen gas for pneumatic valve actuation, and 28 V DC power for pilot solenoid control.

The system is provided with a sample chamber incorporated into a liquid nitrogen jacketed sample chamber. A cavitating venturi is utilized for measuring the flow rate of the liquid gas through the system. Alternatively a gas sample bottle allows the system to operate by extracting a thief sample. A scrubber and filter are located near the outlet of the system to prevent the release of toxic gases into the atmosphere.

It is therefore an object of the invention to provide a new and improved system to test and sample liquified gases.

It is another object of the invention to provide a new and improved system for sampling liquified gases that is simple to operate.

It is a further object of the invention to provide a new and improved system for sampling liquified gases that is easily cleaned and inspected.

It is still another object of the invention to provide a new and improved system for sampling liquified gases that has fail safe operation.

It is still a further object of the invention to provide a new and improved system for sampling liquified gases that is portable.

It is another object of the invention to provide a new and improved system for sampling liquified gases that is capable of semi-remote operation.

It is another object of the invention to provide a new and improved system for sampling liquified gases that provides a safe means for the disposal of toxic material.

It is another object of the invention to provide a new and improved sampling system for fluids that will achieve more accurate sample repeatability than any system hitherto known.

It is another object of the invention to provide a new and improved liquid sample chamber that will concentrate particulate to provide an adequate sample size for analysis.

It is another object of the invention to provide a new and improved sampling system that will collect and concentrate materials that are solid particles at cryogenic temperatures but which are volatile gases or liquids at ordinary ambient temperatures.

It is another object of the invention to provide a new and improved sampling system that will collect and concentrate materials that are solid particles at both cryogenic and ordinary ambient temperatures.

It is another object of the invention to provide a new and improved system which will separate the concentrated materials that are solid at ambient temperatures from those that are solid only at cryogenic temperatures and are liquids or volatile gases at ambient temperatures.

It is another object of the invention to provide a sampling system which is economical to produce and utilizes conventional, currently available components that lend themselves to standard mass production manufacturing techniques.

These and other objects, advantages, features and objects of the invention will become more apparent from the following description taken in connection with the illustrative embodiment in the accompanying drawings.

DETAILED DESCRIPTION OF THE PREFERRED EMBODIMENT

Figure 1:
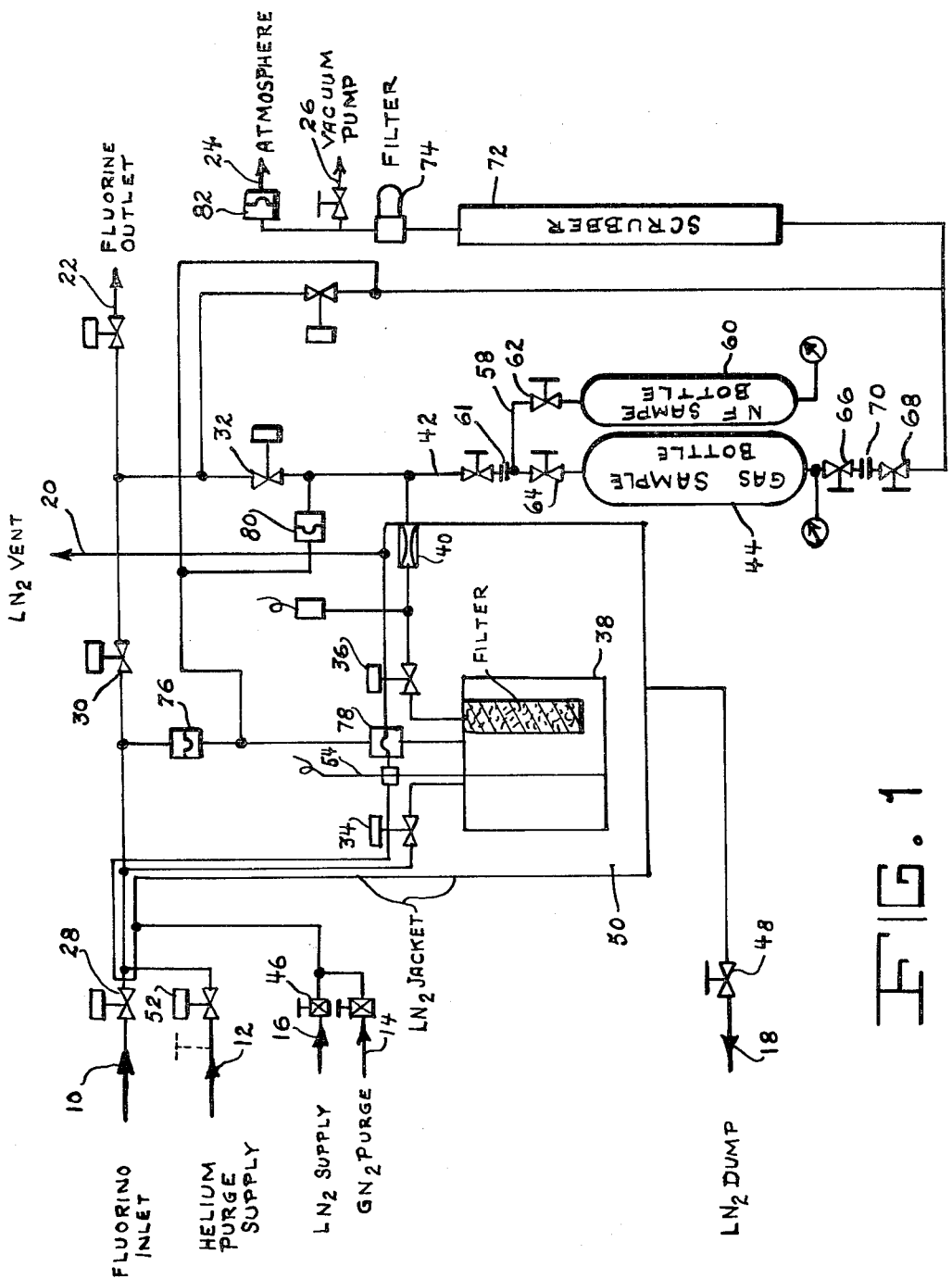
FIG. 1 is a schematic diagram of the sampler system of the invention.

Referring now to FIG. 1, the system is adapted to accept four inputs. A fluorine inlet 10, a helium purge supply 12, a gaseous nitrogen supply 14 for controlling pneumatic valves, and a liquid nitrogen supply 16 make up the fluid input to the system. Outputs from the system include liquid nitrogen dump 18, $LN_2$ vent 20, the fluorine outlet 22, a vent to atmosphere 24, and a vacuum pump connection 26.

The system may be operated in either of two modes; the first mode involves taking a flow sample while the second mode is the taking of a thief sample. The flow sample is obtained by bypassing the liquid fluoring flow between inlet valve 28 and outlet valve 30, by opening valve 32 and closing valve 30. Valves 34 and 36 are opened when the flow sample "start" button (FIG. 2) is depressed, and the flow is automatically terminated at the preset time by a timer. This flow makes it possible to collect sufficient particulate in the small sample chamber 38 for convenient analysis. The total quantity of liquid fluorine flowing through the chamber is determined by the time and flow rate through a cavitating venturi 40 at stabilized temperature and pressure.

After the flow has been terminated by the timer, a known volume of liquid gas and concentrated particulate is trapped in the sample chamber 38. This sample is held at liquid nitrogen temperature while the line 42 to the gas sample bottle 44 is purged and evacuated. Valve 46 is closed, valve 48 is opened and the liquid nitrogen is then drained from the cooling jacket 50 on a gas purge via valve 52 introduced into the liquid nitrogen jacket at a rate so that the temperature in the liquid sample chamber 50 rises at a controlled rate as sensed by the thermocouple 54.

The liquid gas flashes into its gaseous form by expansion into the gas sample bottle 44 upon the opening of valve 36. The flow of gas is stopped by closing valve 36 when the pressure reaches a stable level indicating that all of the liquid has flashed to gas. The gas is evacuated from the liquid sample chamber while solids including ice remain in the liquid chamber 38. The sampler is allowed to warm to ambient conditions, and the ice and other condensible gases are then allowed to flow past valve 36 via line 58 to the sample bottle 60. The valves 62 and 63 at connection 64 are closed and the bottles removed and taken to a laboratory for a complete analysis of the gases in both sample bottles.

A gross quantity of condensible gases may be determined by the pressure and temperature in the sample chamber after the liquid nitrogen jacket has been drained and the sample warms to ambient conditions, thus allowing the operator at the test site to have an immediate indication of excessive impurities and to stop the flow operation until a laboratory analysis has been completed.

In the alternative mode of operation a thief sample may be taken, after establishing a single phase liquid flow through the bypass system, by opening the inlet valve 34 to the evacuated chilled liquid sample chamber, with the valve 36 closed. After sufficient time has been allowed to completely fill the chamber 38 with liquid, inlet valve 34 is closed and outlet valve 36 is opened. The evacuated gas sample bottle 44 and the liquid sample chamber 38 are allowed to reach equilibrium at ambient temperature by draining the liquid nitrogen jacket 50. This makes available for analysis a homogeneous sample of fluorine and condensable and noncondensable gases in both sample containers. After removal of the gas from the liquid chamber, the chamber can be disassembled for inspection of solid particulate and for cleaning.

Regardless of the method used in obtaining the sample, the gas sample bottle assembly 44 may be removed after closing valves 62, 64 and 66. The system is purged through valves 56 and 68 and separated at connections 61 and 70.

The sampler is provided with a scrubber and filter 72, 74 to prevent toxic gases from escaping into the atmosphere should one of the burst valves 76, 78, 80 or 82 rupture as a safety precaution.

Figure 2:
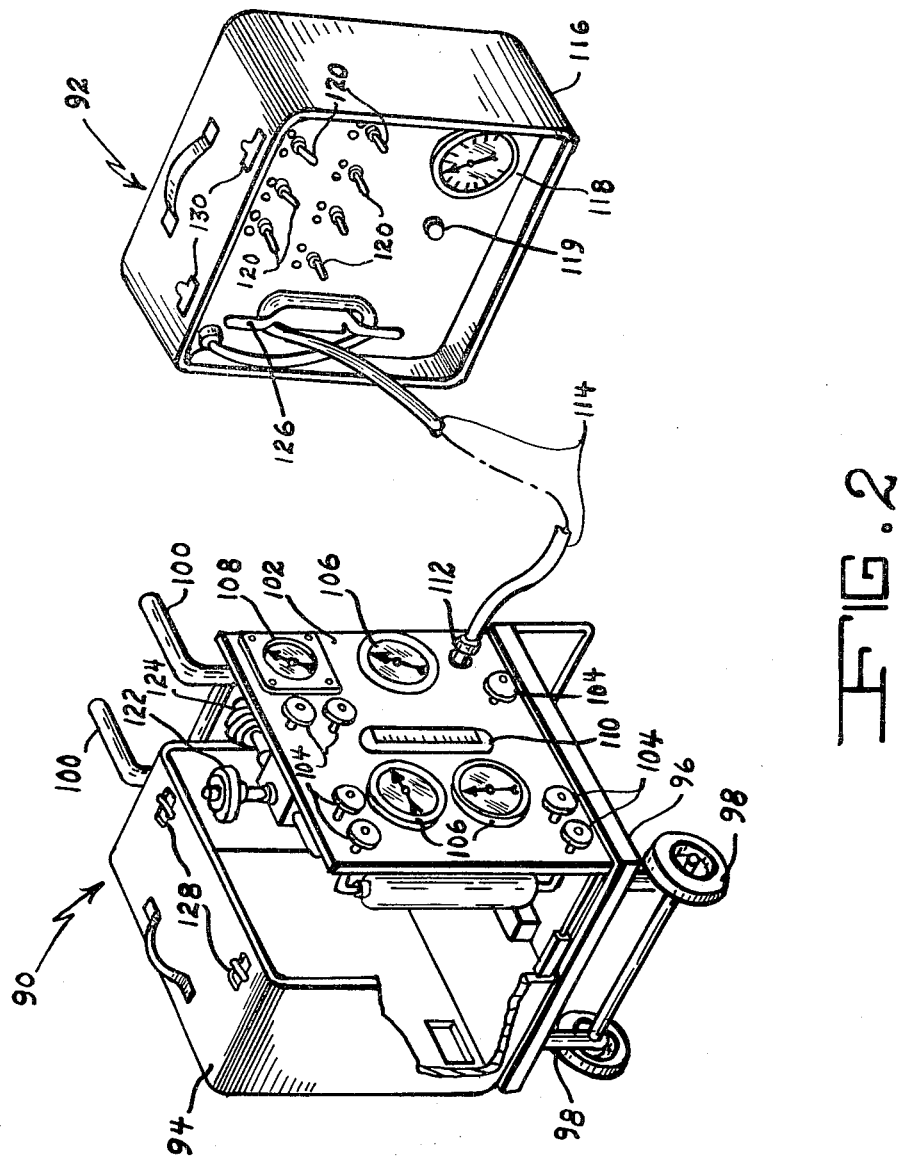
FIG. 2 is a perspective view partially cut away of the invention.

Now concerning FIG. 2, the sampling system is shown generally at 90 with the remote operating control system at 92. The sampling system is housed in a metal container 94 having six sides, including a front and back. The entire container is mounted on a frame 96 having wheels 98 and handles 100 for ease of handling. Located on the front side 102 of the container are the operating knobs 104 for the hand valves and pressure gauges 106 for indicating pressures at various points throughout the system. A temperature gauge 108 is connected to the thermocouple in the sample chamber and provides temperature readings of the liquified gases therein. An additional temperature sensor is located on the front side at 110 for providing scrubber temperature which increases when the scrubber becomes contaminated. An electrical outlet 112 is provided for the lead 114 to connect the remote control unit 92 to the main system 90.

The remote control unit 92 consists of a case 116 containing a time clock and flow timer 118, start button 119 and switches 120 for operating the pneumatic valves; for example, 122 and 124.

When in its stored condition, the lead 114 is disconnected from the plug 112 and stored around the bracket 126, the case 116 is positioned in the midsection of the container 94, behind the front side 102. Fasteners 128 mate with fasteners 130 to lock the case 116 securely in position.

Figure 3:
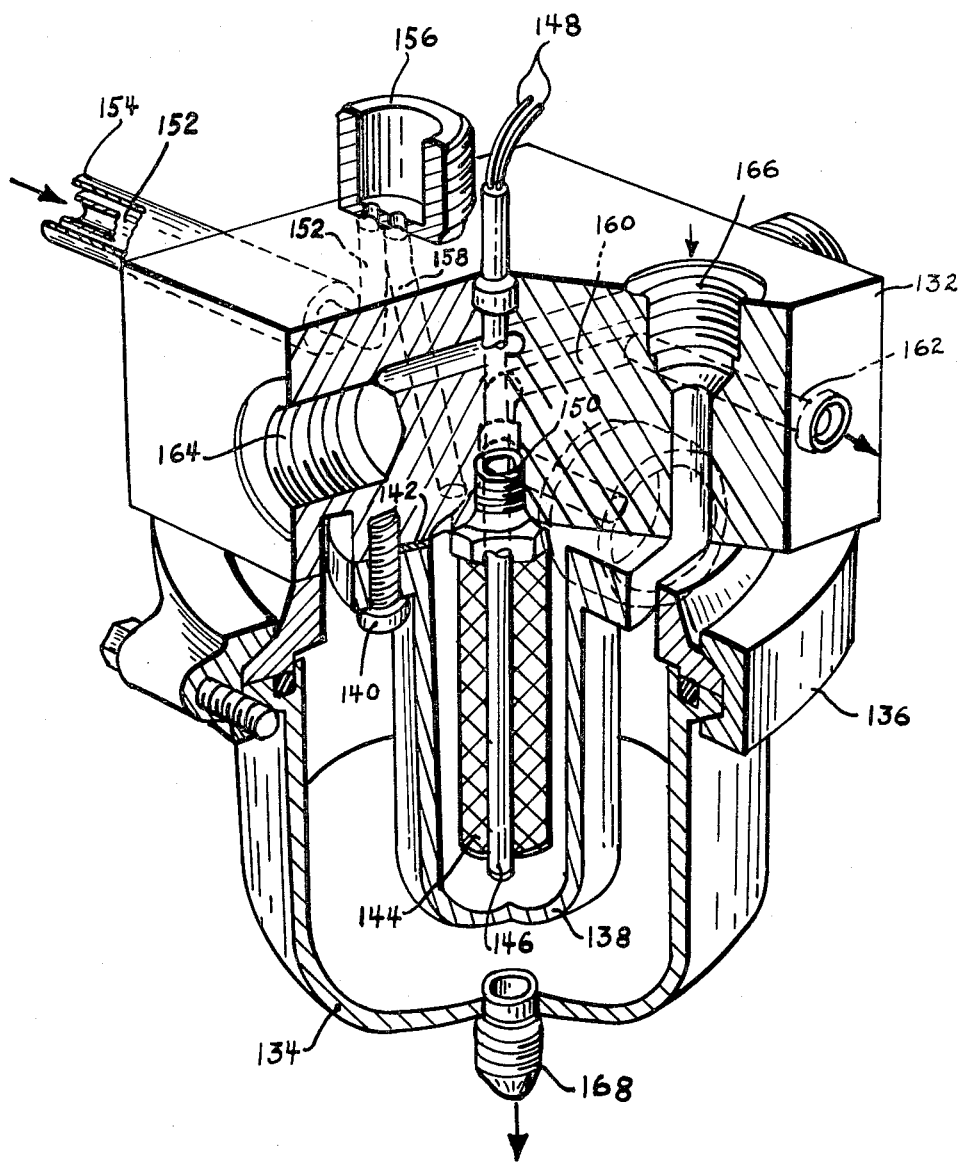
FIG. 3 is a pictorial view of the sample chamber, partly in section.

FIG. 3 discloses the details of the liquid gas sample chamber. The chamber consists of a manifold 132 and an outer jacket 134. The outer jacket is secured to the manifold by the clamp 136. Within the jacket 134 is the liquid gas container 138 which is secured to the manifold 132 by a series of bolts, one of which is shown at 140. A serrated flange aluminum seal 142 is positioned to insure a complete separation of the gases. Within the container 138 is a filter 144 capable of trapping all particulates over 10 microns in size. A thermocouple 146 is positioned along the longitudinal axis of the filter and extends through the filter into the container 138. Leads 148 connect the thermocouple to the temperature indicator on the front side of the system container. The filter and thermocouple and sealed and come as a unit which is threaded into the manifold 132 at 150.

The liquid gas enters the sampling chamber through the line 152, which is surrounded by a cooling jacket 154. Control of the gas is maintained by a pneumatic valve (not shown) which is mounted on the valve seat 156. Gas entering line 152 passes the valve seat 156, proceeds along line 158 to the container 138 and thence through the filter and into line 160 which divides and provides line 162 to the gas sample bottle and line 164 which is the liquid gas outlet port.

Liquid nitrogen for cooling the sample chamber cooling jacket 134 enters through port 166 and is drained through the fitting 168 on the base of the jacket.

The sample chamber is operated in the system as hereinbefore discussed.

Having thus described my portable liquid gas sampler system, I claim the following as my invention.

1. A system for sampling liquified gases comprising: a sample chamber means for sampling liquified gases for liquid and solid impurities; valve means for controlling the flow of liquified gas within the system; means for cooling said sample chamber; a first means connected to said sample chamber for accepting and storing a sample; a second means connected to said sample chamber for accepting solid impurities, and means for preventing the escape of toxic gas outside of said system.

2. A system for sampling liquified gases according to claim 1 wherein said chamber comprises a manifold, an inner container and outer jacket connected to said manifold a temperature sensing means mounted in said inner chamber and a filter means located in said inner chamber to trap solid contaminants.

3. A system for sampling liquified gases according to claim 1 wherein said means for cooling the sample chamber include a jacket adapted to contain a refrigerant surrounding said sample chamber.

4. A system for sampling liquified gases according to claim 1 including: cavitating venturi means connected to the sample chamber for controlling the flow of the liquified gas through the chamber whereby contaminants in the sampled gas will be concentrated in the sample chamber.

* * * * *